(12) United States Patent
Kubo et al.

(10) Patent No.: US 8,131,299 B2
(45) Date of Patent: Mar. 6, 2012

(54) LOCATION REGISTRATION AREA ASSIGNING METHOD AND WIRELESS COMMUNICATION SYSTEM

(75) Inventors: Shigeyasu Kubo, Chigasaki (JP);
Yosuke Takahashi, Kawasaki (JP);
Akihiko Yoshida, Yokohama (JP); Daigo Takayanagi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/948,924

(22) Filed: Nov. 18, 2010

(65) Prior Publication Data

US 2011/0124341 A1  May 26, 2011

(30) Foreign Application Priority Data

Nov. 20, 2009  (JP) .................................. 2009-265442

(51) Int. Cl.
*H04W 36/00* (2009.01)
*H04W 4/00* (2009.01)
(52) U.S. Cl. ...................... 455/440; 455/435.1; 455/436
(58) Field of Classification Search .......... 455/436–443, 455/432.1, 435.1–435.2, 448, 456.1, 418–420; 370/331
See application file for complete search history.

(56) References Cited

U.S. PATENT DOCUMENTS

| 7,076,258 | B2 * | 7/2006 | Motegi et al. ............... 455/456.1 |
| 7,376,423 | B2 * | 5/2008 | Sakanaba ................... 455/435.1 |
| 2010/0029298 | A1 | 2/2010 | Iwamura et al. | |

FOREIGN PATENT DOCUMENTS

JP  2008-193261  8/2008

OTHER PUBLICATIONS

3GPP TS 23.401 V9.01.0 (2009-063).
3GPP TS 24.301 V8.2.0 (Jun. 2009).

* cited by examiner

*Primary Examiner* — Brandon Miller
(74) *Attorney, Agent, or Firm* — Antonelli, Terry, Stout & Kraus, LLP.

(57) ABSTRACT

A call processing control apparatus automatically detects that a lot of handover and location registration simultaneously occur, and notifies a monitor control server. The monitor control server receiving the notification from the call processing control apparatus transmits a TAI change request to a base station so that a tracking area identity (TAI) of a movement destination cell where congestion occurs and a tracking area identity of a movement origin cell have the same value. The base station receiving the TAI change request message from the monitor control server changes its own TAI value. After that, all mobile devices perform only handover when they move between the cells where the TAI values are changed, and does not perform location registration.

12 Claims, 28 Drawing Sheets

| LOCATION REGISTRATION INOFRMATION DATABASE OF MOBILE DEVICE A ||
|---|---|
| TAI list | TAI = 1 |

FIG. 9A

| LOCATION REGISTRATION INOFRMATION DATABASE OF MOBILE DEVICE B ||
|---|---|
| TAI list | TAI = 1 |

FIG. 9B

| LOCATION REGISTRATION INOFRMATION DATABASE OF MOBILE DEVICE C ||
|---|---|
| TAI list | TAI = 1 |

FIG. 9C

| LOCATION REGISTRATION INOFRMATION DATABASE OF MOBILE DEVICE D ||
|---|---|
| TAI list | TAI = 1 |

FIG. 9D

| BASE STATION INFORMATION DATABASE OF BASE STATION A ||
|---|---|
| CELL a ||
| TAI | 1 |
| CELL b ||
| TAI | 1 |
| CELL c ||
| TAI | 1 |

FIG. 10A

| BASE STATION INFORMATION DATABASE OF BASE STATION B ||
|---|---|
| CELL d ||
| TAI | 2 |
| CELL e ||
| TAI | 2 |
| CELL f ||
| TAI | 2 |

FIG. 10B

| BASE STATION INFORMATION DATABASE OF BASE STATION C ||
|---|---|
| CELL g ||
| TAI | 3 |
| CELL h ||
| TAI | 3 |
| CELL i ||
| TAI | 3 |

FIG. 10C

| BASE STATION INFORMATION DATABASE OF CALL PROCESSING CONTROL APPARATUS | | | |
|---|---|---|---|
| BASE STATION A | CELL a | TAI | 1 |
| | CELL b | TAI | 1 |
| | CELL c | TAI | 1 |
| BASE STATION B | CELL d | TAI | 2 |
| | CELL e | TAI | 2 |
| | CELL f | TAI | 2 |
| BASE STATION C | CELL g | TAI | 3 |
| | CELL h | TAI | 3 |
| | CELL i | TAI | 3 |

FIG. 11A

| LOCATION REGISTRATION INFORMATION DATABASE OF CALL PROCESSING CONTROL APPARATUS | | |
|---|---|---|
| MOBILE DEVICE A | TAI list | TAI = 1 |
| MOBILE DEVICE B | TAI list | TAI = 1 |
| MOBILE DEVICE C | TAI list | TAI = 1 |
| MOBILE DEVICE D | TAI list | TAI = 1 |

FIG. 11B

| SIGNALING REDUCTION PARAMETER DATABASE OF CALL PROCESSING CONTROL APPARATUS | | |
|---|---|---|
| COUNT RESET TIMER | | T 1 |
| CONGESTION DETECTION TIMER | | T 2 |
| THE NUMBER OF TIMES OF CONTINUOUS OCCURRENCE OF HANDOVER AND LOCATION REGISTRATION PER UNIT TIME | a<->b | M = 23, N = 100 |
| | a<->c | M = 11, N = 100 |
| | a<->d | M = 99, N = 100 |
| | b<->c | M = 3, N = 100 |
| | c<->d | M = 54, N = 100 |
| | c<->e | M = 13, N = 100 |
| | d<->e | M = 23, N = 100 |
| | d<->f | M = 3, N = 100 |
| | e<->f | M = 6, N = 100 |
| | e<->g | M = 0, N = 100 |
| | f<->g | M = 31, N = 100 |
| | f<->h | M = 19, N = 100 |
| | g<->h | M = 22, N = 100 |
| | g<->i | M = 31, N = 100 |
| | h<->i | M = 22, N = 100 |

FIG. 11C

| BASE STATION INFORMATION DATABASE OF MONITOR CONTROL SERVER | | | |
|---|---|---|---|
| BASE STATION A | CELL a | TAI | 1 |
| | CELL b | TAI | 1 |
| | CELL c | TAI | 1 |
| BASE STATION B | CELL d | TAI | 2 |
| | CELL e | TAI | 2 |
| | CELL f | TAI | 2 |
| BASE STATION C | CELL g | TAI | 3 |
| | CELL h | TAI | 3 |
| | CELL i | TAI | 3 |

FIG. 12

| LOCATION REGISTRATION INFORMATION DATABASE OF CALL PROCESSING CONTROL APPARATUS | | |
|---|---|---|
| MOBILE DEVICE A | TAI list | TAI = 1, 2 |
| MOBILE DEVICE B | TAI list | TAI = 1, 2 |
| MOBILE DEVICE C | TAI list | TAI = 1 |
| MOBILE DEVICE D | TAI list | TAI = 1 |

FIG. 13

| LOCATION REGISTRATION INOFRMATION DATABASE OF MOBILE DEVICE A ||
|---|---|
| TAI list | TAI = 1, 2 |

FIG. 14A

| LOCATION REGISTRATION INOFRMATION DATABASE OF MOBILE DEVICE B ||
|---|---|
| TAI list | TAI = 1, 2 |

FIG. 14B

| SIGNALING REDUCTION PARAMETER DATABASE OF CALL PROCESSING CONTROL APPARATUS ||  |
|---|---|---|
| COUNT RESET TIMER | T 1 ||
| CONGESTION DETECTION TIMER | T 2 ||
| THE NUMBER M OF TIMES OF CONTINUOUS OCCURRENCE OF HANDOVER AND LOCATION REGISTRATION PER UNIT TIME IN MOVEMENT BETWEEN EACH CELLS AND THRESHOLD N | a<->b | M = 23, N = 100 |
| | a<->c | M = 11, N = 100 |
| | a<->d | M = 101, N = 100 |
| | b<->c | M = 3, N = 100 |
| | c<->d | M = 54, N = 100 |
| | c<->e | M = 13, N = 100 |
| | d<->e | M = 23, N = 100 |
| | d<->f | M = 3, N = 100 |
| | e<->f | M = 6, N = 100 |
| | e<->g | M = 0, N = 100 |
| | f<->g | M = 31, N = 100 |
| | f<->h | M = 19, N = 100 |
| | g<->h | M = 22, N = 100 |
| | g<->i | M = 31, N = 100 |
| | h<->i | M = 22, N = 100 |

FIG. 15

| BASE STATION INFORMATION DATABASE OF MONITOR CONTROL SERVER ||||
|---|---|---|---|
| BASE STATION A | CELL a | TAI | 10 |
| | CELL b | TAI | 1 |
| | CELL c | TAI | 1 |
| BASE STATION B | CELL d | TAI | 10 |
| | CELL e | TAI | 2 |
| | CELL f | TAI | 2 |
| BASE STATION C | CELL g | TAI | 3 |
| | CELL h | TAI | 3 |
| | CELL i | TAI | 3 |

FIG. 16

| BASE STATION INFORMATION DATABASE OF BASE STATION A ||
|---|---|
| CELL a ||
| TAI | 10 |
| CELL b ||
| TAI | 1 |
| CELL c ||
| TAI | 1 |

FIG. 17A

| BASE STATION INFORMATION DATABASE OF BASE STATION B ||
|---|---|
| CELL d ||
| TAI | 10 |
| CELL e ||
| TAI | 2 |
| CELL f ||
| TAI | 2 |

FIG. 17B

| LOCATION REGISTRATION INOFRMATION DATABASE OF MOBILE DEVICE A ||
|---|---|
| TAI list | TAI = 1, 2, 10 |

FIG. 18A

| LOCATION REGISTRATION INOFRMATION DATABASE OF MOBILE DEVICE B ||
|---|---|
| TAI list | TAI = 1, 2, 10 |

FIG. 18B

| LOCATION REGISTRATION INOFRMATION DATABASE OF MOBILE DEVICE C ||
|---|---|
| TAI list | TAI = 1, 10 |

FIG. 18C

| LOCATION REGISTRATION INOFRMATION DATABASE OF MOBILE DEVICE D ||
|---|---|
| TAI list | TAI = 1, 10 |

FIG. 18D

| LOCATION REGISTRATION INFORMATION DATABASE OF CALL PROCESSING CONTROL APPARATUS | | |
|---|---|---|
| MOBILE DEVICE A | TAI list | TAI = 1, 2, 10 |
| MOBILE DEVICE B | TAI list | TAI = 1, 2, 10 |
| MOBILE DEVICE C | TAI list | TAI = 1, 10 |
| MOBILE DEVICE D | TAI list | TAI = 1, 10 |

FIG. 19A

| BASE STATION INFORMATION DATABASE OF CALL PROCESSING CONTROL APPARATUS | | | |
|---|---|---|---|
| BASE STATION A | CELL a | TAI | 10 |
| | CELL b | TAI | 1 |
| | CELL c | TAI | 1 |
| BASE STATION B | CELL d | TAI | 10 |
| | CELL e | TAI | 2 |
| | CELL f | TAI | 2 |
| BASE STATION C | CELL g | TAI | 3 |
| | CELL h | TAI | 3 |
| | CELL i | TAI | 3 |

FIG.19B

| LOCATION REGISTRATION INOFRMATION DATABASE OF MOBILE DEVICE C ||
|---|---|
| TAI list | TAI = 1, 10 |

FIG. 21A

| LOCATION REGISTRATION INOFRMATION DATABASE OF MOBILE DEVICE D ||
|---|---|
| TAI list | TAI = 1, 10 |

FIG. 21B

| BASE STATION INFORMATION DATABASE OF BASE STATION A ||
|---|---|
| CELL a ||
| TAI | 10 |
| CELL b ||
| TAI | 1 |
| CELL c ||
| TAI | 1 |

FIG. 22A

| BASE STATION INFORMATION DATABASE OF BASE STATION B ||
|---|---|
| CELL d ||
| TAI | 10 |
| CELL e ||
| TAI | 2 |
| CELL f ||
| TAI | 2 |

FIG. 22B

| BASE STATION INFORMATION DATABASE OF CALL PROCESSING CONTROL APPARATUS | | | |
|---|---|---|---|
| BASE STATION A | CELL a | TAI | 10 |
| | CELL b | TAI | 1 |
| | CELL c | TAI | 1 |
| BASE STATION B | CELL d | TAI | 10 |
| | CELL e | TAI | 2 |
| | CELL f | TAI | 2 |
| BASE STATION C | CELL g | TAI | 3 |
| | CELL h | TAI | 3 |
| | CELL i | TAI | 3 |

FIG. 23

| LOCATION REGISTRATION INFORMATION DATABASE OF CALL PROCESSING CONTROL APPARATUS | | |
|---|---|---|
| MOBILE DEVICE A | TAI list | TAI = 1, 2, 10 |
| MOBILE DEVICE B | TAI list | TAI = 1, 2, 10 |
| MOBILE DEVICE C | TAI list | TAI = 1, 10 |
| MOBILE DEVICE D | TAI list | TAI = 1, 10 |

FIG. 24

| SIGNALING REDUCTION PARAMETER DATABASE OF CALL PROCESSING CONTROL APPARATUS ||  |
|---|---|---|
| COUNT RESET TIMER | T1 ||
| CONGESTION DETECTION TIMER | T2 ||
| THE NUMBER M OF TIMES OF CONTINUOUS OCCURRENCE OF HANDOVER AND LOCATION REGISTRATION PER UNIT TIME IN MOVEMENT BETWEEN EACH CELLS AND THRESHOLD N | a<->b | M = 23, N = 100 |
| | a<->c | M = 11, N = 100 |
| | a<->d | M = NULL, N = NULL |
| | b<->c | M = 3, N = 100 |
| | c<->d | M = 54, N = 100 |
| | c<->e | M = 13, N = 100 |
| | d<->e | M = 23, N = 100 |
| | d<->f | M = 3, N = 100 |
| | e<->f | M = 6, N = 100 |
| | e<->g | M = 0, N = 100 |
| | f<->g | M = 31, N = 100 |
| | f<->h | M = 19, N = 100 |
| | g<->h | M = 22, N = 100 |
| | g<->i | M = 31, N = 100 |
| | h<->i | M = 22, N = 100 |

FIG. 25

| BASE STATION INFORMATION DATABASE OF MONITOR CONTROL SERVER ||||
|---|---|---|---|
| BASE STATION A | CELL a | TAI | 10 |
| | CELL b | TAI | 1 |
| | CELL c | TAI | 1 |
| BASE STATION B | CELL d | TAI | 10 |
| | CELL e | TAI | 2 |
| | CELL f | TAI | 2 |
| BASE STATION C | CELL g | TAI | 3 |
| | CELL h | TAI | 3 |
| | CELL i | TAI | 3 |

FIG. 26

| LOCATION REGISTRATION INFORMATION DATABASE OF CALL PROCESSING CONTROL APPARATUS | | |
|---|---|---|
| MOBILE DEVICE A | TAI list | TAI = 1, 2, 10 |
| MOBILE DEVICE B | TAI list | TAI = 1, 2, 10 |
| MOBILE DEVICE C | TAI list | TAI = 1, 2, 10 |
| MOBILE DEVICE D | TAI list | TAI = 1, 2, 10 |

FIG. 27

| LOCATION REGISTRATION INOFRMATION DATABASE OF MOBILE DEVICE C ||
|---|---|
| TAI list | TAI = 1, 2, 10 |

FIG. 28A

| LOCATION REGISTRATION INOFRMATION DATABASE OF MOBILE DEVICE D ||
|---|---|
| TAI list | TAI = 1, 2, 10 |

FIG. 28B

LOCATION REGISTRATION AREA ASSIGNING METHOD AND WIRELESS COMMUNICATION SYSTEM

CLAIM OF PRIORITY

The present application claims priority from Japanese patent application JP 2009-265442 filed on Nov. 20, 2009, the contents of which are hereby incorporated by reference into this application.

BACKGROUND OF THE INVENTION

1. Field of the Invention

The present invention relates to a location registration area assigning method and a wireless communication system, and particularly to a signaling traffic reduction technique in which attention is paid to the separation between processes of location registration and handover.

2. Description of the Related Art

In order to use services such as mail and streaming video, a mobile device performs packet communication with a base station by wireless, and transmits and receives data for service to and from the Internet network through a gateway. When performing the packet communication with the base station, the mobile device may move between base stations. When the mobile device, which is located in a cell and performs the packet communication with the base station, moves to another cell, the mobile device and the base station perform a process called handover in order to continue the packet communication. The handover is disclosed in, for example, non-patent document 1. In the handover disclosed in non-patent document 1, the mobile device performs, in addition to the packet communication, signaling communication with a movement destination base station in order to change a packet communication destination from a movement origin cell to a movement destination cell. The packet communication and the signaling communication performed on a wireless section between the mobile device and the base station are performed on the same physical channel (physical shared channel). Since the packet communication and the signaling communication share the same physical shared channel, as the amount of signaling communication increases, the physical shared channel is congested and the data communication speed decreases.

Besides, when the mobile device performing the packet communication with the base station moves between cells, there is a case where not only the handover but also location registration is performed. The location registration is performed in order to notify a call processing control apparatus that the mobile device is located in which cell at present. The mobile device and the call processing control apparatus manage a paging area for informing an incoming call to the mobile device as a Tracking Area Identity list (TAI list). When a TAI of the movement destination cell is not included in the TAI list of the mobile device, the mobile device performs the location registration. The TAI is assigned to all cells, and is notified as notification information to the mobile device by the base station which manages the cell. The location registration using the TAI list is disclosed in, for example, non-patent document 2. Although the TAI list can be constructed of different combination of TAIs for plural mobile devices, since the number of TAIs which can be stored in the TAI list is 16, the combinations are limited. Thus, according to the combination of TAIs, plural user equipments (UE) perform location registration in the same cell.

Patent document 1: JP-A-2008-193261 (P2008-193261A)
Non-patent document 1: 3GPP (3rd generation partnerships) 3GPP TS 23.401 V9. 1.0
Non-patent document 2: 3GPP (3rd generation partnerships) 3GPP TS 24.301 V8.2.1

When a mobile device moves between cells when the packet communication is performed between the mobile device and the base station, not only the handover but also the location registration simultaneously occurs. The non-patent document 1 prescribes a process when the handover and the location registration simultaneously occur. In this case, since signaling communication due to the handover and the location registration occurs on the physical shared channel, the physical shared channel is more congested than in the case of signaling communication due to either one of them. Besides, when the handover and the location registration simultaneously occur since many mobile devices in a train or a bus move between cells, since a lot of signaling traffic occurs at a boundary between specific cells, the physical shared channel is further congested. When the physical shared channel is congested, the wireless state between the mobile device and the base station is congested, and the data communication speed is locally reduced.

As stated above, when plural mobile devices during data communication move between cells, the handover and the location registration can simultaneously occur in the movement destination cell. At this time, at a cell boundary, since a lot of signaling traffic occurs between the base station and the plural mobile devices, there is a problem that the physical shared channel is congested, and the data communication speed is locally reduced.

SUMMARY OF THE INVENTION

In view of the above circumstances, an object of the invention is to provide a location registration area assigning method for reducing the congestion of a physical shared channel due to simultaneous occurrence of handover and location registration, and a wireless communication system.

The invention provides a TAI assigning method for preventing location registration from occurring during a handover process.

A call processing control apparatus always counts how many times per unit time a simultaneous occurrence process of handover and location registration occurs in movement of plural mobile devices between specific cells. When the counted number of times exceeds a previously set threshold, the call processing control apparatus notifies a monitor control server of cell information of a movement origin and a movement destination, and further notifies that a physical shared channel is congested by simultaneous occurrence of the handover and the location registration. The monitor control server that received the notification from the call processing control apparatus transmits a TAI change request message to base stations so that a TAI of the movement destination cell where congestion occurs and a TAI of the movement origin become the same value. The two base stations that received the TAI change request message from the monitor control server respectively change their own TAI values.

In a wireless communication system, handover and location registration are locally separated in order to suppress the local reduction of data communication speed.

According to the first solving means of this invention, there is provided a location registration area assigning method in a wireless communication system in which a handover process is performed when a mobile device communicating with a base station moves between cells, and a location registration process is performed to notify which cell the mobile device is located in, when an area identifier of the mobile device is different from an area identifier of a cell received from the base station, the location registration area assigning method comprising:

detecting that both the handover process and the location registration process occur between a first cell and a second cell in a previously determined time interval with respect to an arbitrary mobile device;

counting the number of times of detection; and changing area identifiers of the first cell and the second cell to a common identifier when counted number of times exceeds a previously determined threshold, and temporally separating an occurrence timing of a handover process of another mobile device between the first cell and the second cell from an occurrence timing of a location registration process of said another mobile device.

According to the second solving means of this invention, there is provided a wireless communication system in which a handover process is performed when a mobile device moves between cells, and a location registration process is performed to notify which cell the mobile device is located in, when an area identifier of the mobile device is different from an area identifier of a cell received from a base station, the wireless communication system comprising:

a base station to communicate with the mobile device;

a call processing control apparatus to execute the handover process and the location registration process; and a monitor control server to assign an area identifier to a cell, wherein the call processing control apparatus detects that both the handover process and the location registration process occur between a first cell and a second cell in a previously determined time interval with respect to an arbitrary mobile device, the call processing control apparatus counts the number of times of detection;

the call processing control apparatus, when the counted number of times exceeds a previously determined threshold, notifies the monitor control server of exceeding the threshold, the monitor control server changes area identifiers of the first cell and the second cell to a common identifier in accordance with notification, and temporally separates an occurrence timing of a handover process of another mobile device between the first cell and the second cell from an occurrence timing of a location registration process of said another mobile device.

According to the invention, the call processing control apparatus automatically detects a cell where congestion occurs, and the TAI values of two adjacent cells where the congestion occurs are made the same value. Thus, plural mobile devices during data communication move between the cells, only the handover occurs, and the location registration occurs in movement between other cells. According to the invention, since the handover and the location registration can be locally separated, the congestion of the physical shared channel due to the simultaneous occurrence of the handover and the location registration can be reduced.

BRIEF DESCRIPTION OF THE DRAWINGS

FIGS. 9A to 9D are views showing information elements of location registration information databases of mobile devices during data communication.

FIGS. 10A to 10C are views showing information elements of base station information databases of base stations.

FIGS. 11A to 11C are views showing information elements of a base station information database of a call processing control apparatus, a location registration information database, and a signaling reduction parameter database.

FIG. 12 is a view showing information elements of a base station information database of a monitor control server.

FIG. 13 is a view showing the location registration information database of the call processing control apparatus after mobile devices perform location registration.

FIGS. 14A and 14B are views showing location registration information databases of mobile devices.

FIG. 15 is a view showing that the number M of times of continuous occurrence of handover and location registration exceeds a threshold N.

FIG. 16 is a view showing information elements of the base station information database of the monitor control server.

FIGS. 17A and 17B are views showing information elements of base station information databases of base stations.

FIGS. 18A to 18D are views showing location registration information databases of mobile devices after the mobile devices belonging to base stations perform location registration since the base stations correct TAI values.

FIGS. 19A and 19B are views showing information elements of the location registration information database of the call processing control apparatus and the base station information database.

FIGS. 21A and 21B are views showing location registration information databases of mobile devices.

FIGS. 22A and 22B are views showing base station information databases of base stations.

FIG. 23 is a view showing the base station information database of the call processing control apparatus.

FIG. 24 is a view showing the location registration information database of the call processing control apparatus.

FIG. 25 is a view showing the signaling reduction parameter database of the call processing control apparatus.

FIG. 26 is a view showing the base station information database of the monitor control server.

FIG. 27 is a view showing the location registration information database of the call processing control apparatus after mobile devices perform location registration.

FIGS. 28A and 28B are views showing location registration information databases of mobile devices.

DETAILED DESCRIPTION OF THE INVENTION

Hereinafter, embodiments of the invention will be described in detail with reference to the drawings.

Figure 1:
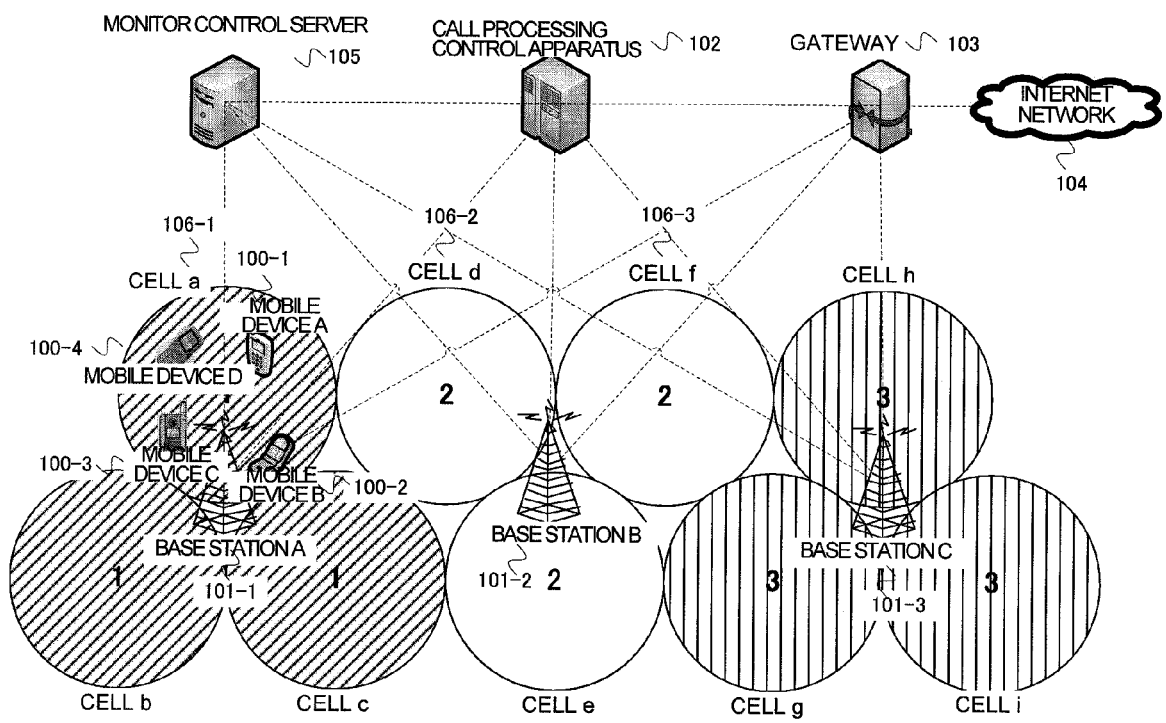
FIG. 1 is a view showing a system structure before plural mobile devices during data communication move between cells.

FIG. 1 is a view showing a structure of a wireless communication system to which an embodiment is applied. In this embodiment, although the number of mobile devices (wireless terminals) is limited to four and the description will be made, the number of mobile devices is arbitrary, and the same process can be performed.

The wireless communication system includes a mobile device A 100-1, a mobile device B 100-2, a mobile device C 100-3, a mobile device D 100-4, a base station A 101-1, a base station B 101-2, a base station C 101-3, a call processing control apparatus 102, a gateway 103, an Internet network 104, and a monitor control server 105. The base station A 101-1, the base station B 101-2 and the base station C 101-3 manage cells 106 (cell a 106-1, cell d 106-2). The mobile device 100 and the base station 101 communicate with each other by wireless. The base station 101, the call processing control apparatus 102, the gateway 103 and the monitor control server 105 are connected by wire in a mesh form. The gateway 103 is connected to the Internet network 104. The mobile device 100 transmits and receives data to and from a server positioned in the Internet network 104 through the base station 101 and the gateway 103.

The mobile device 100 performs handover and location registration with the call processing control apparatus 102 through the base station 101. For example, when the mobile devices 100-1 and 100-2 during data communication move from the cell a 106-1 to the cell d 106-2, the mobile devices 100-1 and 100-2 transmit handover requests to the base station B 101-2. The base station B 101-2 performs handover with the base station A 101-1, and notifies the processing result to the call processing control apparatus 102. The mobile devices 100-1 and 100-2 during data communication perform location registration when the TAI of the belonging cell is not included in their own TAI lists. For example, when the mobile devices 100-1 and 100-2 during data communication move from the cell a 106-1 to the cell d, and the TAI value of the movement destination cell d 106-2 is not included in the TAI lists stored in their own memories, the mobile devices 100-1 and 100-2 respectively perform location registration. The mobile devices 100-1 and 100-2 respectively transmit location registration messages to the base station B 101-2 by wireless. Here, the location registration message includes, for example, the TAI value of the movement destination cell d 106-2. The base station B 101-2 transfers the location registration messages received from the mobile devices 100-1 and 100-2 to the call processing control apparatus 102. When receiving the location registration messages, the call processing control apparatus 102 confirms that the mobile devices 100-1 and 100-2 are located in the cell d of the base station B101-1, and stores the correspondence between the mobile device and the TAI value.

Figure 2:
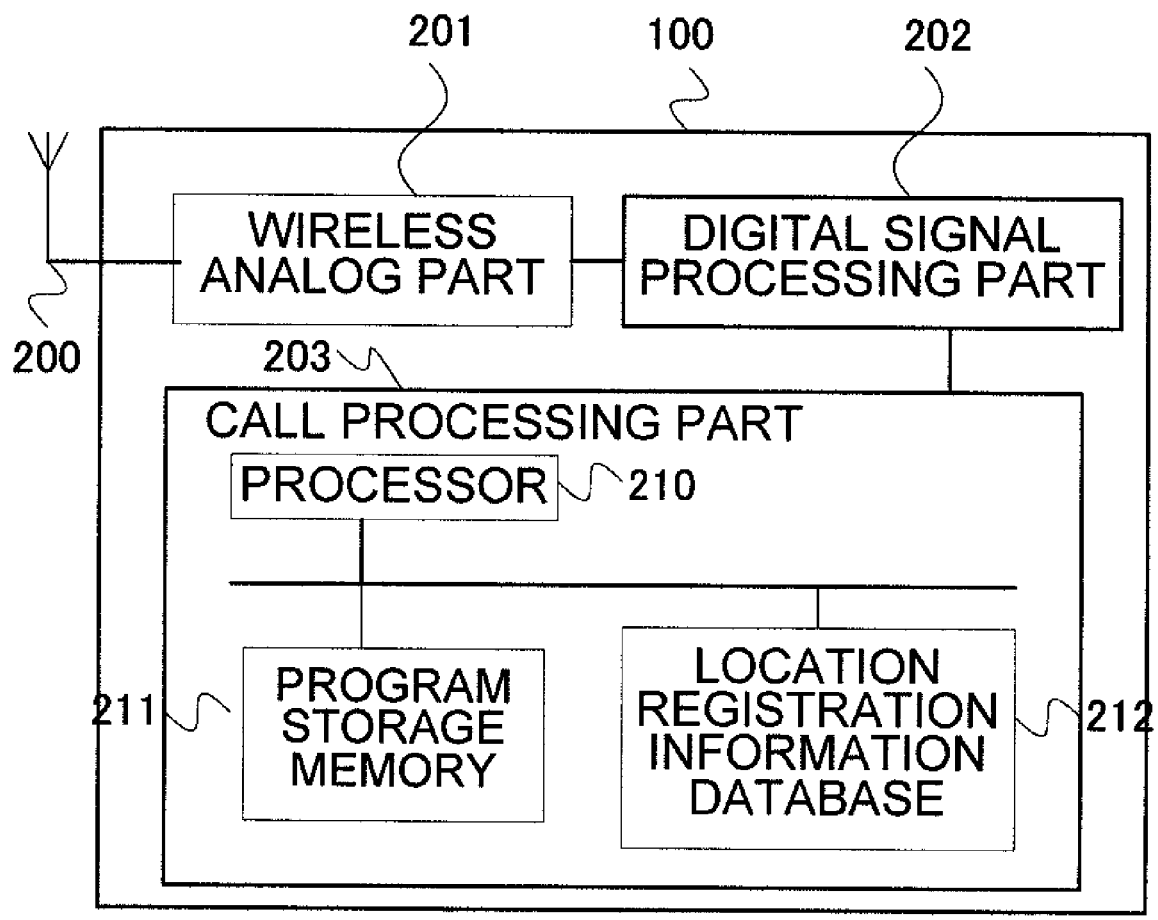
FIG. 2 is a block diagram showing a structure of a wireless terminal.

FIG. 2 is a block diagram showing a structure of the mobile device 100.

The mobile device 100 includes a transmission/reception antenna 200, a wireless analog part 201 connected to the antenna 200, a digital signal processing part 202 connected to the wireless analog part 201, and a call processing part 203 connected to the digital signal processing part 202.

Here, the wireless analog part 201 converts an analog signal received from the base station 101 through the antenna 200 into a digital signal, and outputs it to the digital signal processing part 202. Besides, the wireless analog part 201 converts a digital signal received from the digital signal processing part 202 into an analog signal, and transmits it to the base station 101 through the antenna 200. The digital signal processing part 202 performs demodulation of the signal from the wireless analog part 201 and modulation of the signal to the base station 101. The call processing part 203 includes a processor (control part) 210, a memory 211 to store programs executed by the processor 210, and a location registration information database 212 to store a TAI list transmitted from the call processing control apparatus 102.

The mobile device 100 has a function to transmit a handover request to the base station 101 when moving between cells during data communication, and a function to transmit a location registration message to the base station 101 when it is detected that the TAI value of the movement destination cell is not included in its own TAI list. These functions are realized in such a way that, for example, a program stored in the memory 211 is executed by the processor 210. The same applies to another apparatus.

Figure 3:
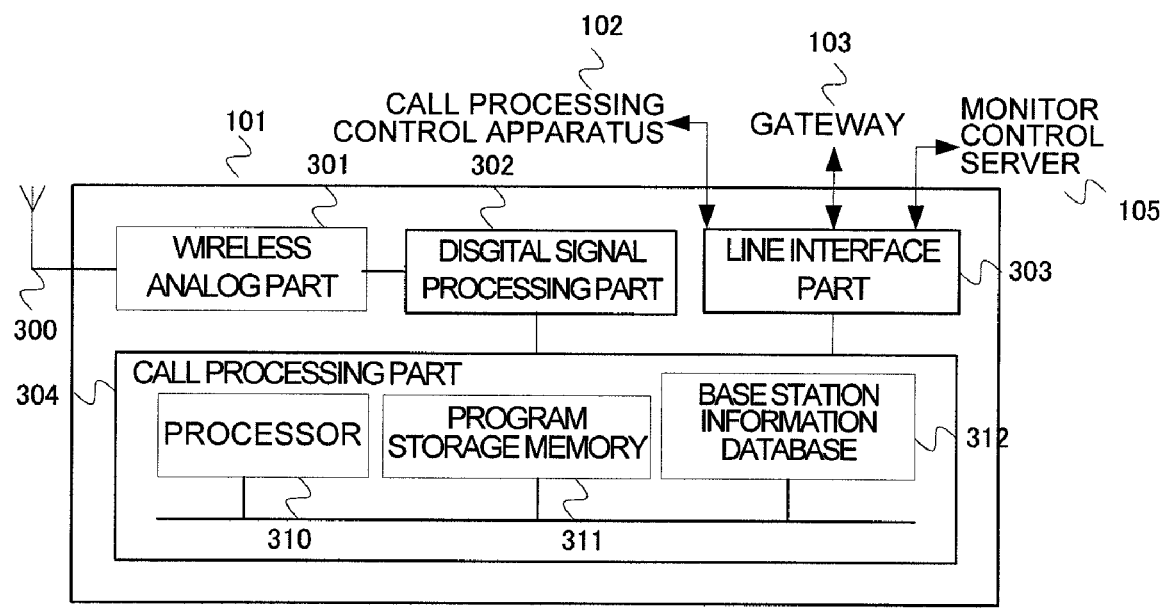
FIG. 3 is a block diagram showing a structure of a base station.

FIG. 3 is a block diagram showing a structure of the base station 101.

The base station 101 includes a transmission/reception antenna 300, a wireless analog part 301 connected to the antenna 300, a digital signal processing part 302 connected to the wireless analog part 301, a call processing part 304 connected to the digital signal processing part 302, and a line interface part 303 connected to the call processing part 304. The line interface part 303 is connected also to the call processing control apparatus 102, the gateway 103 and the monitor control server 105.

Here, the wireless analog part 301 converts an analog signal received from the mobile device 100 through the antenna 300 into a digital signal, and outputs it to the digital signal processing part 302. Besides, the wireless analog part 301 converts a digital signal received from the digital signal processing part 302 into an analog signal, and transmits it to the mobile device 100 through the antenna 300. The digital signal processing part 302 performs demodulation of the signal from the wireless analog part 301 and modulation of the signal to the mobile device 100. The call processing part 304 includes a processor (control part) 310, a memory 311 to store programs executed by the processor 310, and a base station information database 312 to store a TAI as a tracking area identity of the base station 101.

The base station 101 has a function to transmit a location registration message transmitted from the mobile device 100 to the call processing control apparatus 102, a function to transmit a response to the location registration message transmitted from the call processing control apparatus 102 to the mobile device 100, a function to perform cell switchover to the movement origin cell based on the information of the handover request transmitted from the mobile device 100, a function to transmit a handover instruction to the mobile device 100 as a result of execution of the cell switchover, a function to transmit, to the call processing control apparatus 102, which cell is switched to which cell as a result of handover, a function to change its own TAI when the change request of the TAI is received from the monitor control server 105, and a function to notify the call processing control apparatus 102 that the TAI is changed.

Figure 4:
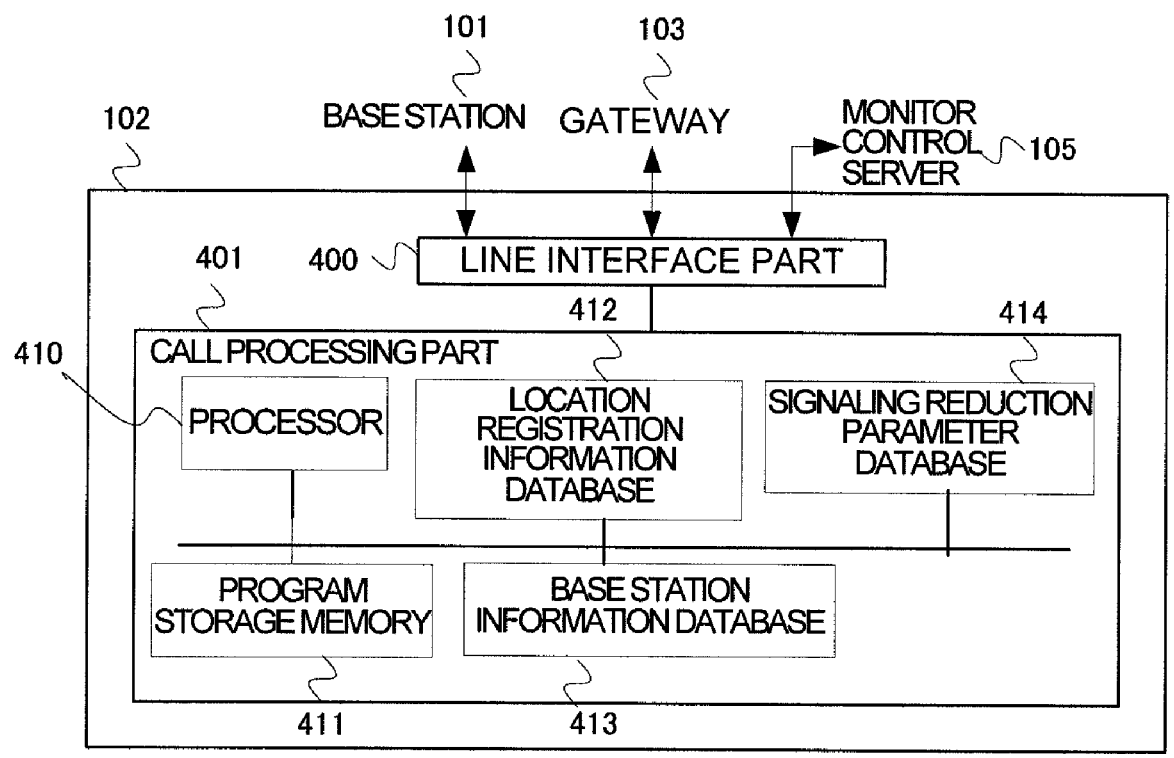
FIG. 4 is a block diagram showing a structure of a call processing control apparatus.

FIG. 4 is a block diagram showing a structure of the call processing control apparatus 102.

The call processing control apparatus 102 includes a line interface part 400 connected to the base station 101, the gateway 103 and the monitor control server 105, and a call processing part 401 connected to the line interface part 400.

Here, the call processing part 401 includes a processor (control part) 410, a memory 411 to store programs executed by the processor 410, a location registration information database 412 to store a TAI list, a base station information database 413 to store a TAI as a tacking area identity of the base station 101, and a signaling reduction parameter database 414 to store a timer for detecting whether handover and location registration simultaneously occur, cell movement information based on reception of notification of a handover result from the base station 101 and indicating that movement occurs from which cell to which cell, information of a belonging cell in which the mobile device 100 transmits a location registration request message, the number of times of continuous occurrence of handover and location registration, and a threshold for detecting that a simultaneous occurring phenomenon of handover and location registration occurs a regulated number of times or more.

The call processing control apparatus 102 has a function to determine whether the handover and the location registration performed by the mobile device 100 simultaneously occur, a function to receive the notification of a handover result from the base station 101 and to store that movement occurs from which cell to which cell, a function to store a cell where the location registration is performed by the mobile device 100, a function to count the number of times the handover and the location registration simultaneously occur, a function to determine that a physical shared channel between the mobile device 100 and the base station 101 is congested by the handover and the location registration when the number of times the handover and the location registration simultaneously occur exceeds a regulated number, a function to notify the monitor control server 105 that the physical shared channel between the mobile device 100 and the base station 101 is congested, a function to store a cell where the location registration occurs based on a location registration request message transmitted from the base station 101, a function to newly derive a TAI list as a new paging area based on information elements of the location registration message notified from the mobile device 100, and a function to update the TAI value of the base station database 413 when a TAI change notification from the base station is received.

Figure 5:
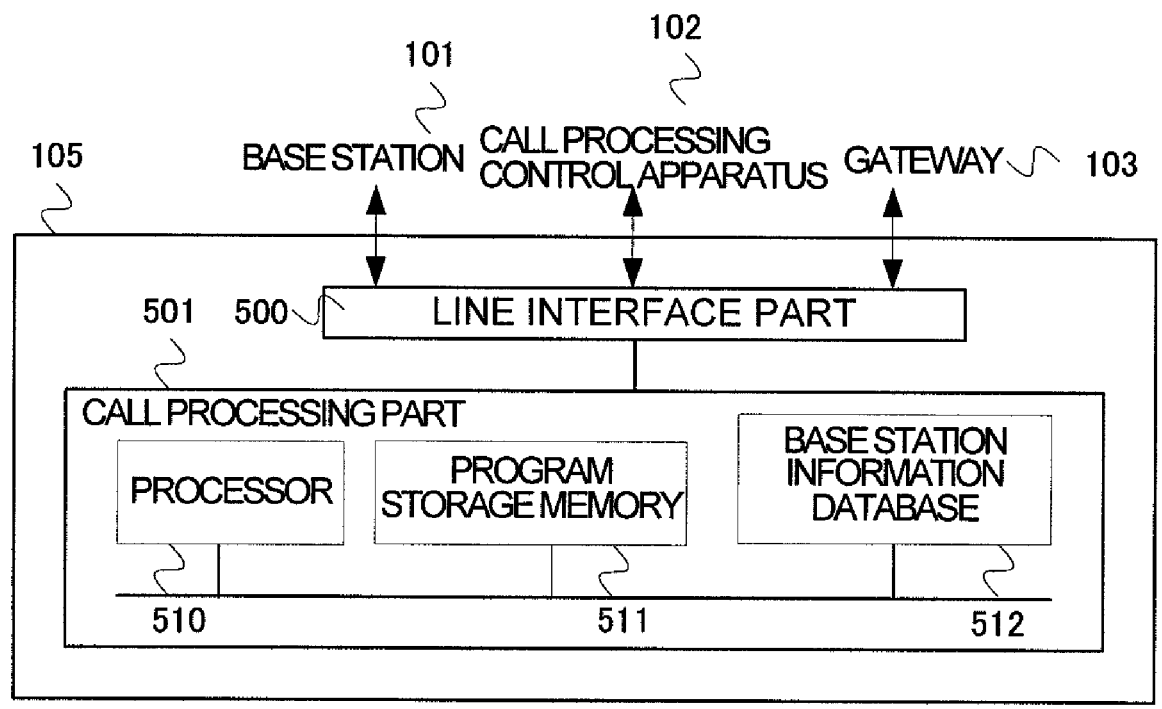
FIG. 5 is a block diagram showing a structure of a monitor control server.

FIG. 5 is a block diagram showing a structure of the monitor control server 105.

The monitor control server 105 includes a line interface part 500 connected to the base station 101, the call processing control apparatus 102 and the gateway 103, and a call processing part 501 connected to the line interface part 500.

Here, the call processing part 501 includes a processor (control part) 510, a memory 511 to store programs executed by the processor 510, and a base station information database 512 to store a TAI as a tracking area identity of the base station 101.

The monitor control server 105 has a function to start a reassignment process of the TAI when a load notification caused by simultaneous occurrence of handover and location registration is received from the call processing control apparatus 102, and a function to transmit a message to request the base station to change the TAI.

Figure 6:
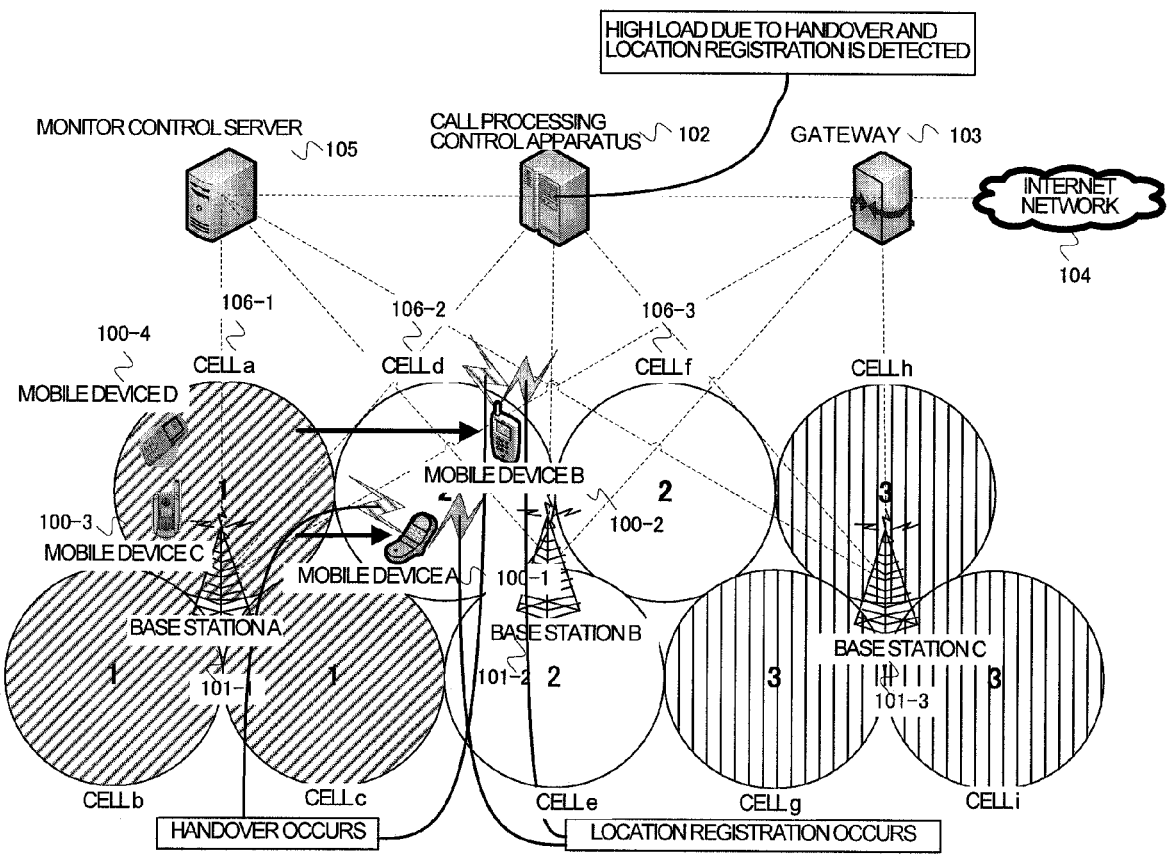
FIG. 6 is a system structural view showing that plural mobile devices during data communication move between cells, and handover and location registration simultaneously occur in a movement destination cell.

FIG. 6 is a system structural view showing that the mobile device A 100-1 and the mobile device B 100-2 during data communication move between cells, and handover and location registration simultaneously occur in a movement destination cell. Since the mobile device A 100-1 and the mobile device B 100-2 simultaneously perform the location registration and the handover, the physical shared channel is congested by signaling traffic due to the location registration and the handover in an area of a cell edge between the cell a 106-1 and the cell d 106-2. Since the physical shared channel is congested, the data communication speeds of the mobile device A 100-1 and the mobile device B 100-2 are locally reduced. Although FIG. 6 shows the state where only the two mobile devices of the mobile device A 100-1 and the mobile device B 100-2 move between the cell a 106-1 and the cell d 106-2, actually, there is a case where several tens of mobile devices in a train or a bus move between the cells at a time. When several tens of mobile devices in the train or the bus are performing data communication and perform the location registration, a lot of signaling traffic occurs in the area of the cell edge between both the cells. Since the lot of signaling traffic significantly congests the physical shared channel used in data communication, the data communication speed is locally reduced.

Figure 7:
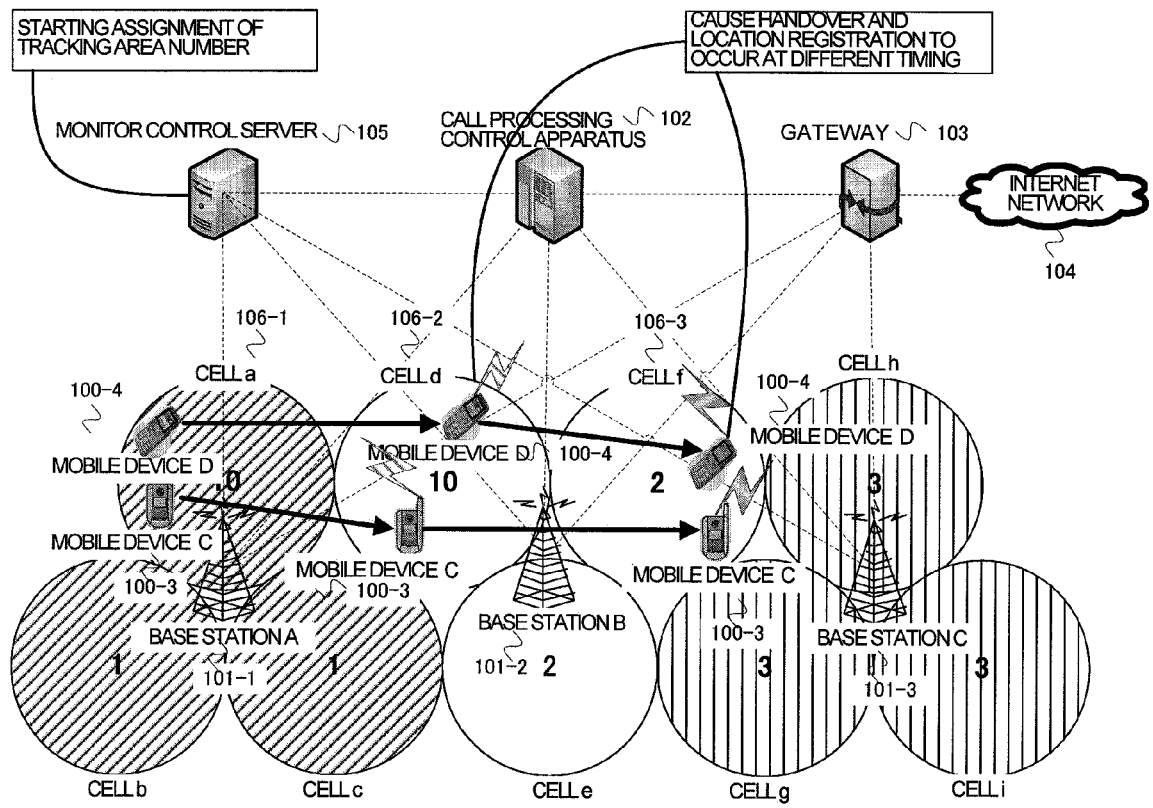
FIG. 7 is a system structural view showing that since TAI values of two adjacent cells are made the same, even if plural mobile devices during data communication move between the cells, handover and location registration do not simultaneously occur in the movement destination cell.
Figure 8:
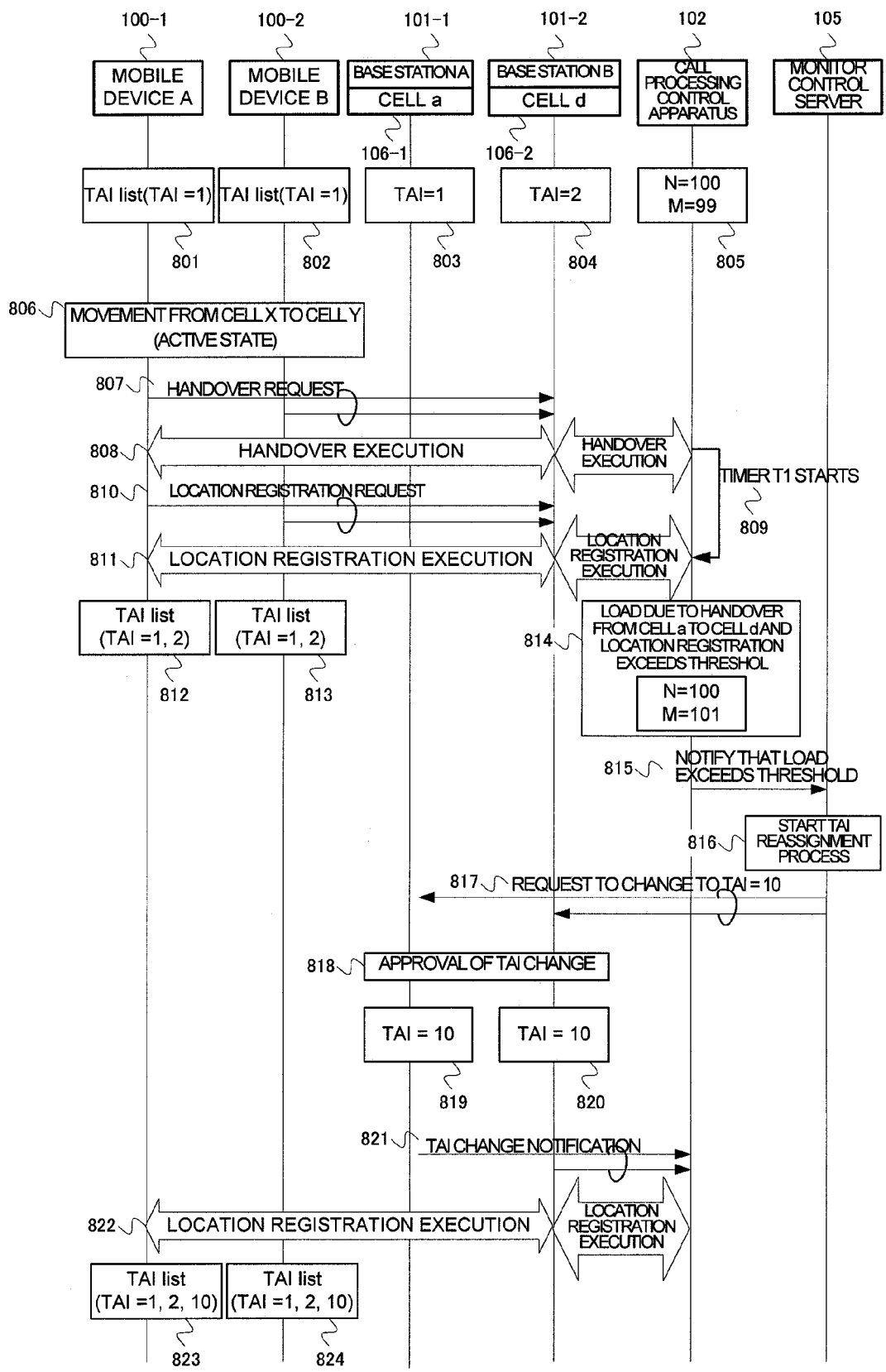
FIG. 8 is a sequence view showing TAI reassignment to prevent handover and location registration from simultaneously occurring.
Figure 20:
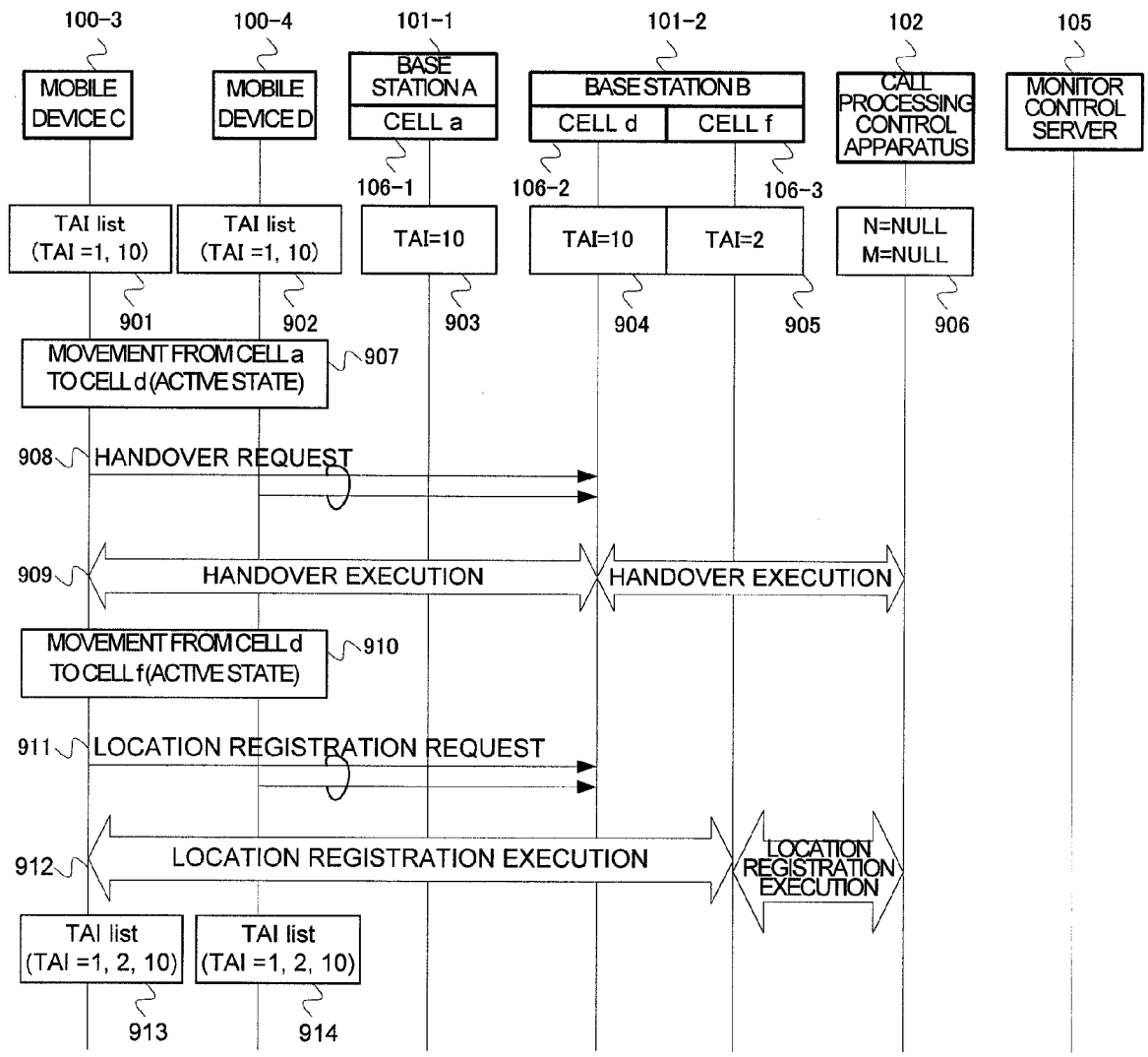
FIG. 20 is a sequence view showing location registration and handover after TAI reassignment.

FIG. 7 is a system structural view showing that since TAI values of two adjacent cells are made the same, even if plural mobile devices during data communication move between the cells, the handover and the location registration do not simultaneously occur in the movement destination cell. When the TAI values of the cell a 106-1 and the cell d 106-2 are made the same, the location registration does not occur between the cell a 106-1 and the cell d 106-2. The location registration occurs in movement between cells except between the cell a 106-1 and the cell d 106-2. When the handover and the location registration are locally separated, the occurrence of a lot of signaling traffic due to the handover and the location registration can be reduced. When the occurrence of a lot of signaling traffic is reduced, the congestion of the physical shared channel in the area of the cell edge between the cell a 106-1 and cell d 106-2 can be prevented, and the local reduction of the data communication speed can be prevented. In FIG. 8 and FIG. 20, a specific processing method will be described by use of the sequence views.

FIG. 8 is a sequence view showing TAI reassignment to prevent simultaneous occurrence of handover and location registration.

FIGS. 9A to 9D, FIGS. 10A to 10C, FIGS. 11A to 11C and FIG. 12 are views showing structures of respective databases and initial information elements of respective units used for the description of the embodiment.

FIG. 9A, FIG. 9B, FIG. 9C and FIG. 9D show information elements of the location registration information databases 212 of the mobile device A 100-1, the mobile device B 100-2, the mobile device C 100-3 and the mobile device D 100-4 during data communication. In the location registration information database 212 of the mobile device 100, the TAI value is stored in the TAI list. FIG. 10A, FIG. 10B and FIG. 10C show information elements of the base station information databases 312 of the base station A 101-1, the base station B 101-2 and the base station C 101-3. In the base station information database 312 of the base station 101, the TAI value is stored for each of cells under the base station. FIG. 11A, FIG. 11B and FIG. 11C show information elements of the base station information database 413 of the call processing control apparatus 102, information elements of the location registration information database 412, and information elements of the signaling reduction parameter database 414 of the call processing control apparatus 102. The TAI value for each of the base stations and each of the cells is stored in the base station information database 413 of the call processing control apparatus 102. The TAI list for each of the mobile devices is stored in the location registration information database 412 of the call processing control apparatus 102. A count reset timer T1, a congestion detection timer T2, the number M of times of continuous occurrence of handover and location registration per unit time in movement between cells, and a threshold N are stored in the signaling reduction parameter database 414 of the call processing control apparatus 102. FIG. 12 shows information elements of the base station information database 512 of the monitor control server 105. The TAI value is stored for each of cells under a base station in the base station information database 512 of the monitor control server 105.

At the time of an operation start of FIG. 8, for example, initial information is stored in the respective databases as described below.

As the TAI value, 1 is previously stored in the TAI list of the location registration information database 212 of the mobile device A 100-1 of FIG. 9A (step 801). The mobile device A 100-1 performs location registration when the TAI of the belonging cell changes a value other than 1.

As the TAI value, 1 is previously stored in the TAI list in the location registration information database 212 of the mobile device B 100-2 of FIG. 9B (step 802). The mobile device B 100-2 performs location registration when the TAI of the belonging cell changes to a value other than 1.

As the TAI value, 1 is previously set for the cell a 106-1 under the base station A 101-1 in the base station information database 312 of FIG. 10A (step 803). The base station A 101-1 notifies the mobile device 100 of the notification information that the cell a 106-1 is managed by TAI=1. When the base station A 101-1 is requested to change the TAI value from the monitor control server 105, the base station changes the TAI value corresponding to the cell as the object of the request in the base station information database 312.

As the TAI value, 2 is set for the cell d 106-2 under the base station B 101-2 in the base station information database 312 of FIG. 10B (step 804). The base station B 101-2 notifies the mobile device 100 of the notification information that the cell d 106-2 is managed by the TAI=2. When the base station B 101-2 is requested to change the TAI value from the monitor control server 105, the base station changes the TAI value corresponding to the cell as the object of the request in the base station information database 312.

The same values as the TAIs which are set in the base station A 101-1 and the base station B 101-2 are set in the base station information database 413 of FIG. 11A. The base station A 101-1 and the base station B 101-2 previously notify the TAI values to the call processing control apparatus 102. The call processing control apparatus 102 updates its own base station information database 413 each time the TAI value is notified from the base station 101.

The same values as the TAI lists of the mobile device A 100-1 and the mobile device B 100-2 are set in the location registration information database 412 of FIG. 11B. When the TAI values notified from the cell a 106-1 managed by the base station A 101-1 and the cell d 106-2 managed by the base station B 101-2 are not included in the TAI lists, the mobile device A 100-1 and the mobile device B 100-2 perform location registration, and transmit location registration request messages to the call processing control apparatus 102. The call processing control apparatus 102 updates the value of the TAI list of the location registration information database 412 each time the mobile device 100 performs the location registration.

The signaling reduction parameter database 414 of FIG. 11C stores a count reset timer T1, a congestion detection timer T2, the number M of times of continuous occurrence of handover and location registration per unit time in movement between cells, and a threshold N.

The count reset timer T1 is the timer for detecting whether the handover and the location registration performed by the mobile device 100 continuously occur. When detecting that the handover starts from the mobile device 100, the call processing control apparatus 102 starts the timer. When the location registration message is received from the same mobile device 100 before the timer expires, it is determined that the handover and the location registration continuously occur. When this timer expires, the call processing control apparatus 102 determines that the handover and the location registration do not continuously occur.

The congestion detection timer T2 is the timer for resetting the number of times of continuous occurrence of handover and location registration per unit time. The call processing control apparatus 102 immediately starts the congestion detection timer when the wireless communication service is started. When the number of times of continuous occurrence of handover and location registration per unit time exceeds the threshold before the congestion detection timer expires, it is determined that the handover and the location registration excessively continuously occur. When this timer expires, the call processing control apparatus 102 resets the number of times of continuous occurrence of handover and location registration per unit time to 0.

The number M of times of handover and location registration per unit time is the information element to indicate how many times the continuous occurrence phenomenon of the handover and location registration occurs per unit time. In this embodiment, a lot of handover and location registration occur between the cell a 106-1 and the cell d 106-2 by plural mobile devices, and it is assumed that M is counted to be 99 (step 805).

The threshold N is the information element for detecting whether the number M of times of continuous occurrence of handover and location registration per unit time exceeds a fixed value. In this embodiment, it is assumed that N is 100 (step 805). When the number M of times of continuous occurrence of handover and location registration per unit time exceeds the threshold N, the call processing control apparatus 102 notifies the monitor control server 105 that the handover and the location registration continuously occur, and congest the physical shared channel of the wireless section. When the number M of times of continuous occurrence of handover and location registration per unit time does not exceed the threshold N, the call processing control apparatus 102 performs nothing.

The same values as the TAIs of the base station A 101-1 and the base station B 101-2 are set in the base station information database 512 of FIG. 12. The base station A 101-1 and the base station B 101-2 set the TAIs to the values previously notified from the monitor control server 105. The base station A 101-1 and the base station B101-2 update their own base station information databases 312 each time the TAI is notified from the monitor control server 105. When the monitor control server 105 is notified from the call processing control apparatus 102 that the number of times of continuous occurrence of handover and location registration per unit time exceeds the threshold, the monitor control server updates the TAI value of the object base station of its own base station information database 512, and requests the base station 101 to change the TAI value.

Return is made to FIG. 8 and an operation will be described.

The mobile device A 100-1 and the mobile device B 100-2 are in a state (active state) where data communication is performed and move from the cell a 106-1 of the base station A 101-1 to the cell d 106-2 of the base station B 101-2 (step

806). The mobile device A 100-1 and the mobile device B 100-2 request the base station B 101-2 to perform handover since they move between the cells during the data communication (step 807). The base station B 101-2 performs the handover to the base station A 101-1, and notifies the call processing control apparatus 102 that the handover is performed (step 808).

When receiving a handover execution notification from the base station B 101-2, the call processing control apparatus 102 starts the timer T1 (step 809). When detecting that location registration is started from the same mobile device 100 before the timer T1 expires, the call processing control apparatus 102 determines that the handover and the location registration continuously occur, and increments the number M of times of continuous occurrence of handover and location registration per unit time in the signaling reduction parameter database 414 of the call processing control apparatus 102 by one for each mobile device. For example, the number M of times of continuous occurrence corresponding to the two relevant cells is incremented. When this timer expires, the call processing control apparatus 102 determines that the handover and the location registration do not continuously occur.

The mobile device A 100-1 and the mobile device B 100-2 transmit location registration requests to the call processing control apparatus 102 through the base station B 101-2 since TAI=2 notified from the cell d 106-2 of the base station B 101-2 is not included in their own TAI lists (step 810). The mobile device A 100-1, the mobile device B 100-2 and the call processing control apparatus 102 perform the location registration through the base station B 101-2, and update the TAI lists (step 811).

FIG. 13 is a view showing the location registration information database 412 after the mobile device A 100-1 and the mobile device B 100-2 perform the location registration. After the mobile device A 100-1 and the mobile device B 100-2 perform the location registration, the call processing control apparatus 102 updates the values of the TAI lists of the mobile device A 100-1 and the mobile device B 100-2 in the location registration information database 412 to TAI=1, 2.

The call processing control apparatus 102 adds TAI=2 of the cell d 106-2, in which the location registration is performed, to the TAI lists of the mobile device A 100-1 and the mobile device B 100-2 in addition to TAI=1, and transmits the TAI lists to the mobile devices. Since the call processing control apparatus 102 receives the location registration messages from the mobile device A 100-1 and the mobile device 100-2 before the timer T expires, the call processing control apparatus determines that the handover and the location registration continuously occur between the cell a and the cell d, and increments the number M of times of continuous occurrence of handover and location registration per unit time in the signaling reduction parameter database 414 of the call processing control apparatus 102 by two. Here, the cell movement information is the cell a—the cell d and the number M of times of continuous occurrence is incremented. In the signaling reduction parameter database 414 of the call processing control apparatus 102, the number M of times of continuous occurrence of handover and location registration per unit time corresponding to the cell a—the cell d is incremented from 99 to 101 (see FIG. 15).

FIG. 14A and FIG. 14B are views showing the location registration information databases 212 of the mobile device A 100-1 and the mobile device B 100-2.

The mobile device A 100-1 sets the TAI list (TAI=1, 2) transmitted from the call processing control apparatus 102 into the location registration information database 212 (step 812). The mobile device B 100-2 sets the TAI list (TAI=1, 2) transmitted from the call processing control apparatus 102 into the location registration information database 212 (step 813).

The call processing control apparatus 102 determines whether the number M of times of continuous occurrence of handover and location registration per unit time in the signaling reduction parameter database 414 of the call processing control apparatus 102 exceeds the threshold N (step 814). This process may be periodically performed or may be performed at the time of execution of location registration.

FIG. 15 is a view showing that the number M of times of continuous occurrence of handover and location registration exceeds the threshold N. After the handover performed by the mobile device A 100-1 and the mobile device B 100-2, since the location registration is performed before the timer T expires, the call processing control apparatus 102 increments the number M of times of continuous occurrence of handover and location registration by two. Since the number M increases from 99 to 101 and exceeds the threshold N=100, the call processing control apparatus determines that the physical shared channel is congested by the continuous occurrence of handover and location registration from the cell a to the cell d.

The call processing control apparatus 102 notifies the monitor control server 105 that the physical shared channel is congested by the continuous occurrence of handover and location registration from the cell a 106-1 to the cell d 106-2 (step 815). The monitor control server 615 changes the TAI values of the cell a 106-1 and the cell d 106-2 to the same TAI value through the call processing control apparatus 102, so that location registration does not occur between the cell a 106-1 and the cell d 106-2. The monitor control server 105 selects, as the TAI value assigned to the cell a 106-1 and the cell d 106-2, for example, a TAI value not used at present by the call processing control apparatus 102.

FIG. 16 is a view showing information elements of the base station information database 512 of the monitor control server 105. The monitor control server 615 sets the same TAI=10 into the cell a 106-1 and the cell d 106-2 through the call processing control apparatus 102, so that location registration does not occur between the cell a 106-1 and the cell d 106-2.

The monitor control server 105 transmits the set TAI value of the cell a 106-1 and the cell d 106-2 to the base station A 101-1 and the base station B 101-2 (step 817). The base station A 101-1 and the base station B 101-2 start a process of approving the TAI value specified by the monitor control server (step 818). When the TAI values of the base station A 101-1 and the base station B 101-2 are changed, location registration is performed at the same time from all mobile devices 100 located in the base stations. At step 818, in order to prevent the wireless section from being congested by the location registration from all the base stations 101 located in the cell a 106-1 and the cell d 106-2, the base station 101 performs a process such as, for example, a process of performing access restriction to part of the mobile devices and preventing location registration from being performed at the same time, or a process of changing the TAI in a previously determined time zone such as midnight in which the communication amount is small. Alternatively, the base station 101 entrusts a maintenance person with final determination as to whether the TAI value is changed and performs a process of, for example, inputting an instruction as to whether the TAI value is changed at present or a process of inputting a desired time for change. When the number of mobile devices located in the cell a and the cell d is not larger than a previously determined threshold (second threshold), the TAI value is changed, and when the number is larger than the threshold, the above process may be performed.

FIG. 17A and FIG. 17B are views showing information elements of the base station information databases 312 of the base station A 101-1 and the base station B 101-2. When the TAI value is approved, the base station A 101-1 sets TAI=10 notified from the monitor control server 105 into the base station information database 312 of the base station 101 (step 819). Similarly, the base station B 101-2 sets TAI=10 notified from the monitor control server 105 into the base station information database 312 of the base station 101 (step 820).

The base station A 101-1 and the base station B 101-2 notify the call processing control apparatus 102 that the TAI values are changed (step 821).

FIG. 18A, FIG. 18B, FIG. 18C and FIG. 18D are views showing the location registration information databases 212 of the mobile device A 100-1, the mobile device B 100-2, the mobile device C 100-3 and the mobile device D 100-4 after the mobile device A 100-1, the mobile device B 100-2, the mobile device C 100-3 and the mobile device D 100-4 located in the base station A 101-1 and the base station B 101-2 perform the location registration since the base station A 101-1 and the base station B 101-2 correct the TAI values. The mobile device A 100-1, the mobile device B 100-2, the mobile device C 100-3 and the mobile device D 100-4 perform the location registration when receiving TAI=10 as the notification information from the base station A 101-1 and the base station B 101-2 (step 822). The location registration procedure of the mobile device A 100-1, the mobile device B 100-2, the mobile device C 100-3 and the mobile device D 100-4 is the same as the procedure at step 810 and step 811 of FIG. 8.

FIG. 19A and FIG. 19B are views showing information elements of the location registration information database 412 of the call processing control apparatus 102 and the base station information database 413 of the call processing control apparatus 102. The call processing control apparatus 102 receiving the location registration requests from the mobile device A 100-1, the mobile device B 100-2, the mobile device C 100-3 and the mobile device D 100-4 updates the TAI list of the mobile device A 100-1 of the location registration information database 412 to TAI=1, 2, 10, updates the TAI list of the mobile device B 100-2 to TAI=1, 2 10, updates the TAI list of the mobile device C 100-3 to TAI=1, 10, and updates the TAI list of the mobile device D 100-4 to TAI=1, 10.

The call processing control apparatus 102, which is notified by the base station A 101-1 and the base station B 101-2 that the TAI values are changed, updates the TAI values of the cell a 106-1 and the cell d 106-2 in the base station information database 413 to 10.

FIG. 20 is a sequence view showing location registration and handover after the TAI reassignment. It is shown that by the process of FIG. 8, when other devices C and D move from the cell a to the cell d, the process of handover and the process of location registration are temporally separated.

FIG. 21A and FIG. 21B are views showing the location registration information databases 212 of the mobile device C 100-3 and the mobile device D 100-4. As the TAI values, 1 and 10 are stored in the TAI lists of the location registration information databases 212 of the mobile device C 100-3 and the mobile device D 100-4 (step 901, step 902). Incidentally, FIGS. 21A and 21B correspond to FIGS. 18C and 18D. The mobile device C 100-3 and the mobile device D 100-4 perform location registration when the TAI of the belonging cell changes to a value other than 1 and 10.

FIG. 22A and FIG. 22B are views showing the base station information databases 312 of the base station A 101-1 and the base station B 101-2. As the TAI value, 10 is set for the cell a 106-1 under the base station A 101-1 in the base station information database 312 of the base station A 101-1 (step 903). Incidentally, FIGS. 22A and 22B correspond to FIGS. 17A and 17B. The base station A 101-1 notifies the mobile device 100, as notification information, that the cell a 106-1 is managed by TAI=10. When the base station A 101-1 is requested by the monitor control server 105 to change the TAI value, the base station changes the TAI value of the base station information database 312. As the TAI value, 10 is set for the cell d 106-2 under the base station B 101-2 in the base station information database 312 of the base station B 101-2 (step 904). The base station B 101-2 notifies the mobile device 100, as notification information, that the cell d 106-2 is managed by TAI=10. When the base station B 101-2 is requested by the monitor control server 105 to change the TAI value, the base station changes the TAI value corresponding to the cell as the object of the request in the base station information database 312.

FIG. 23 is a view showing the base station information database 413 of the call processing control apparatus 102. The same values as the TAIs set in the base station A 101-1, the base station B 101-2 and the base station C101-3 are set in the base station information database 413. Incidentally, FIG. 23 corresponds to FIG. 19. The base station A 101-1, the base station B 101-2 and the base station C101-3 previously notify the TAI values to the call processing control apparatus 102. The call processing control apparatus 102 updates its own base station information database 413 each time the TAI value is notified from the base station 101.

FIG. 24 is a view showing the location registration information database 412 of the call processing control apparatus 102. The same values as those of the TAI lists of the mobile device C 100-3 and the mobile device D 100-4 are set in the location registration information database 412. Incidentally, FIG. 24 corresponds to FIG. 19A. When the TAI value notified from the base station 101 is not included in the TAI list, the mobile device C 100-3 and the mobile device D 100-4 perform location registration, and transmit location registration request messages to the call processing control apparatus 102. The call processing control apparatus 102 updates the value of the TAI list of the location registration information database 412 each time the mobile device 100 performs the location registration.

FIG. 25 is a view showing the signaling reduction parameter database 414 of the call processing control apparatus 102. The signaling reduction parameter database 414 stores a count reset timer, a congestion detection timer, the number M of times of continuous occurrence of handover and location registration per unit time and the threshold N. With respect to the number M of times of continuous occurrence of handover and location registration per unit time in the movement from the cell a to the cell d and the threshold N, the values are made NULL since the simultaneous occurrence of handover and location registration does not occur in the movement from the cell a to the cell d by the process of FIG. 8.

FIG. 26 is a view showing the base station information database 512 of the monitor control server 105. The same values as the TAI values of the base station A 101-1, the base station B 101-2 and the base station C 101-3 are set in the base station information database 512. Incidentally, FIG. 26 corresponds to FIG. 16.

The mobile device C 100-3 and the mobile device D 100-4 perform handover when they move from the cell a 106-1 of the base station A101-2 to the cell d 106-2 of the base station B 101-2 (step 907 to step 909).

The mobile device C 100-3 and the mobile device D 100-4 do not perform location registration here since TAI=10 notified from the cell d 106-2 of the base station B 101-2 is included in their own TAI lists.

Next, the mobile device C 100-3 and the mobile device D 100-4 move from, for example, the cell d 101-2 of the base station B 101-2 to the cell f 101-3 of the base station B 101-2 (step 910).

The mobile device C 100-3 and the mobile device D 100-4 perform location registration since TAI=2 notified from the cell f 106-3 of the base station B 101-2 is not included in their own TAI lists, and transmit location registration requests to the call processing control apparatus 102 through the base station B 101-2 (step 911).

The mobile device C 100-3, the mobile device D 100-4 and the call processing control apparatus 102 perform the location registration through the base station B 101-2, and update the TAI lists (step 912). The call processing control apparatus 102 adds TAI=2 of the cell f 106-3, in which the location registration is performed, to the TAI lists of the mobile device C 100-3 and the mobile device D 100-4 in addition to TAI=1, 10, and transmits the TAI lists to the mobile devices. Incidentally, although handover can occur also here, when the number of mobile devices moving from the cell d to the cell f is small as compared with the number of mobile devices moving from the cell a to the cell d, and the number of times of continuous occurrence of handover process and location registration process is not larger than the threshold, the physical shared channel is not congested. When the number of times of continuous occurrence exceeds the threshold also between the cell d and the cell f, the TAI values can be made the same. In this case, for example, the cell a, the cell d and the cell f may be made to have the same TAI value.

FIG. 27 is a view showing the location registration information database 412 after the mobile device C 100-3 and the mobile device D 100-4 perform location registration. After the mobile device C 100-3 and the mobile device D 100-4 perform the location registration, the call processing control apparatus 102 updates the values of the TAI lists of the mobile device C 100-3 and the mobile device D 100-4 of the location registration information database 412 to TAI=1, 2, 10.

FIG. 28A and FIG. 28B are views showing the location registration information databases 212 of the mobile device C 100-3 and the mobile device D 100-4.

The mobile device C 100-3 sets the TAI list (TAI=1, 2, 10) transmitted from the call processing control apparatus 102 into the location registration information database 212 (step 913).

The mobile device D 100-4 sets the TAI list (TAI=1, 2, 10) transmitted from the call processing control apparatus 102 into the location registration information database 212 (step 914).

In this embodiment, although the call processing control apparatus 102 counts the number of times of simultaneous occurrence of handover and location registration, the base station 101 or the monitor control server 105 may count the number of times of simultaneous occurrence of handover and location registration. In this case, the base station 101 or the monitor control server 105 manages the signaling reduction parameter database 414.

When the monitor control server 105 manages the signaling reduction parameter database 414, the call processing control apparatus 102 always notifies that the handover and the location registration are performed from which mobile device 100 each time the handover and the location registration are performed from the mobile device 100. The monitor control server 105 performs also the determination of the threshold excess at step 814 of FIG. 8.

When the base station 101 manages the signaling reduction parameter database 414, the base station 101 always counts that the handover and the location registration are performed from which mobile device each time the handover and the location registration are performed from the mobile device 100. The base station 101 performs the determination of the threshold excess at step 814 of FIG. 8.

In this embodiment, it is automatically detected that a lot of handover and location registration simultaneously occur in movement between cells, and the reassignment process of the tracking area number is performed so that the handover and the location registration do not simultaneously occur in the movement between the cells. Since the occurrences of the handover and the location registration are locally separated, the local congestion of the physical shared channel can be prevented, and the reduction of data communication speed of plural mobile devices can be prevented.

When a lot of handover and location registration simultaneously occur, when the TAI value of the movement origin cell and that of the movement destination cell are made the same, in a path of a vehicle moving at high speed, such as a bus or a train, especially only a path on which many people come and go can be selectively made to have the same TAI. In the area having the same TAI, not only for a person performing data communication, but also for a person not performing data communication, it is prevented that the location registration occurs at the same time. Thus, the occurrence of a lot of signaling traffic due to the location registration can be prevented, and the wireless resource can be suppressed in the whole area of the wireless communication system.

The invention can be used for, for example, a wireless communication system which includes plural cells, and performs the process of handover and location registration when a mobile device moves between cells.

What is claimed is:

1. A location registration area assigning method in a wireless communication system in which a handover process is performed when a mobile device communicating with a base station moves between cells, and a location registration process is performed to notify which cell the mobile device is located in, when an area identifier held by the mobile device is different from an area identifier of a cell received from the base station, the location registration area assigning method comprising:

detecting that both the handover process and the location registration process occur between a first cell and a second cell in a previously determined time interval with respect to an arbitrary mobile device;

counting the number of times of detection; and changing area identifiers of the first cell and the second cell to a common identifier when counted number of times exceeds a previously determined threshold, and temporally separating an occurrence timing of a handover process of another mobile device between the first cell and the second cell from an occurrence timing of a location registration process of said another mobile device.

2. The location registration area assigning method according to claim 1, wherein a call processing control apparatus starts a timer to measure the time interval when one of the handover process and the location registration process is executed, and the call processing control apparatus detects that both the handover process and the location registration process occur in the previously determined time interval when the other of the handover process and the location registration process is executed before the timer expires.

3. The location registration area assigning method according to claim 1, wherein when the area identifier is changed, the base station restricts access from part of a plurality of mobile devices located in the first cell and the second cell, and receives location registration requests from the plurality of mobile devices caused by the change of the area identifier by temporally shifting the location registration requests.

4. The location registration area assigning method according to claim 1, wherein the area identifiers of the first cell and the second cell are changed to the common identifier in a previously determined time zone.

5. The location registration area assigning method according to claim 1, wherein when the number of mobile devices located in the first cell and the second cell becomes a previously determined second threshold or less, the area identifiers of the first cell and the second cell are changed to the common identifier.

6. The location registration area assigning method according to claim 1, wherein a desired time zone is inputted, and the area identifiers of the first cell and the second cell are changed to the common identifier in the time zone.

7. A wireless communication system in which a handover process is performed when a mobile device moves between cells, and a location registration process is performed to notify which cell the mobile device is located in, when an area identifier held by the mobile device is different from an area identifier of a cell received from a base station, the wireless communication system comprising:
- a base station to communicate with the mobile device;
- a call processing control apparatus to execute the handover process and the location registration process; and
- a monitor control server to assign an area identifier to a cell, wherein
- the call processing control apparatus detects that both the handover process and the location registration process occur between a first cell and a second cell in a previously determined time interval with respect to an arbitrary mobile device,
- the call processing control apparatus counts the number of times of detection;
- the call processing control apparatus, when the counted number of times exceeds a previously determined threshold, notifies the monitor control server of exceeding the threshold,
- the monitor control server changes area identifiers of the first cell and the second cell to a common identifier in accordance with notification, and temporally separates an occurrence timing of a handover process of another mobile device between the first cell and the second cell from an occurrence timing of a location registration process of said another mobile device.

8. The wireless communication system according to claim 7, wherein the call processing control apparatus includes:
- a timer that starts when one of the handover process and the location registration process is executed, and measures the time interval, and
- a memory that stores the counted number of times correspondingly to the identifiers of the first cell and the second cell.

9. The wireless communication system according to claim 7, wherein when the area identifier is changed, the base station restricts access from part of a plurality of mobile devices located in the first cell and the second cell, and receives location registration requests from the plurality of mobile devices caused by the change of the area identifier by temporally shifting the location registration requests.

10. The wireless communication system according to claim 7, wherein
the monitor control server changes the area identifiers of the first cell and the second cell to the common identifier in a previously determined time zone.

11. The wireless communication system according to claim 7, wherein
when the number of mobile devices located in the first cell and the second cell becomes a previously determined second threshold or less, the monitor control server changes the area identifiers of the first cell and the second cell to the common identifier.

12. The wireless communication system according to claim 7, wherein
the monitor control server inputs a desired time zone, and changes the area identifiers of the first cell and the second cell to the common identifier in the time zone.

* * * * *